United States Patent
Ahmed et al.

[11] Patent Number: 5,892,199
[45] Date of Patent: Apr. 6, 1999

[54] GTA WELDING

[75] Inventors: Nasir Uddin Ahmed, Wynn Vale; Ronald Clyde Johnson, Surrey Downs; Thomas William Gordon, Valley View, all of Australia

[73] Assignee: Commonwealth Scientific and Industrial Research Organisation, Australia

[21] Appl. No.: 737,262

[22] PCT Filed: May 11, 1995

[86] PCT No.: PCT/AU95/00269

§ 371 Date: Dec. 4, 1996

§ 102(e) Date: Dec. 4, 1996

[87] PCT Pub. No.: WO95/31306

PCT Pub. Date: Nov. 23, 1995

[30] Foreign Application Priority Data

May 13, 1994 [AU] Australia .................... PM5580

[51] Int. Cl.[6] .................................................. B23K 9/167
[52] U.S. Cl. ............................................ 219/137 R; 219/75
[58] Field of Search ........................ 219/75, 136, 137.62, 219/137 R, 145.21

[56] References Cited

U.S. PATENT DOCUMENTS

| | | | |
|---|---|---|---|
| 2,468,807 | 5/1949 | Herbst | 219/75 |
| 3,007,032 | 10/1961 | Whiteman | 219/75 |
| 3,018,360 | 1/1962 | Engel | 219/75 |
| 3,309,492 | 3/1967 | Fields | 219/75 |
| 3,950,629 | 4/1976 | Auzary et al. | 219/75 |
| 4,002,878 | 1/1977 | Disney | 219/75 |
| 4,103,143 | 7/1978 | Yamauchi et al. | 219/145.21 |
| 4,142,084 | 2/1979 | Torrani | 219/60 |
| 4,788,401 | 11/1988 | Kleppen | 219/75 |
| 5,258,599 | 11/1993 | Moerke | 219/75 |

FOREIGN PATENT DOCUMENTS

| | | |
|---|---|---|
| 0074761 | 4/1976 | Australia . |
| 0037269 | 1/1980 | Australia . |
| 2340166 | 9/1977 | France . |

*Primary Examiner*—Clifford C. Shaw
*Attorney, Agent, or Firm*—Ladas & Parry

[57] ABSTRACT

A welding torch (10) for gas tungsten arc (tungsten inert gas) welding includes a housing (12) and an electrode holder (50, 52) which is mounted on the housing so as to project therefrom, and which is adapted to hold an electrode (54) such that the electrode projects from an end of the holder remote from the housing. A shroud (14) is mounted on, or forms part of, the housing (12) and extends around but is spaced from the electrode holder (50, 52). Electrically conductive means (46, 48) extends within the housing (12) for electrically connecting the electrode holder (50, 52) to one terminal of an electric power source. The torch (10) is adapted for connection to a source of an inert gas for generating a flow of gas through the shroud (14), around the electrode holder (50, 52). Also the torch (10) has inlet port means (30; 94a) and outlet port means (32; 95a) by which it is adapted for connection to a source of coolant fluid for circulation of the coolant through a passage (28) defined within the housing (12) and extending along substantially the full extent of the conductive means (46, 48), and through a passage (93) defined within the shroud (14).

42 Claims, 7 Drawing Sheets

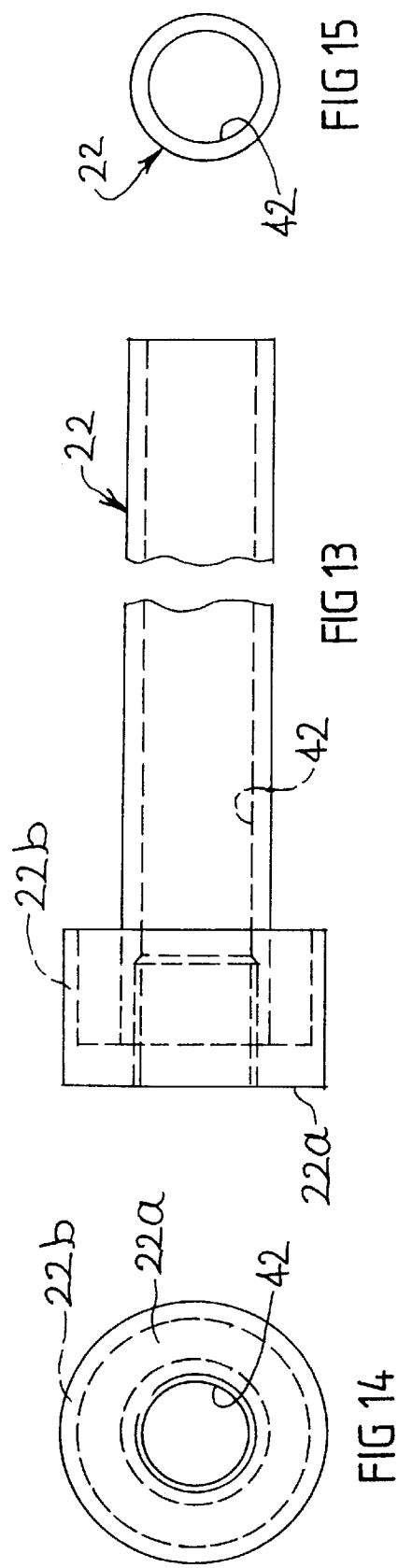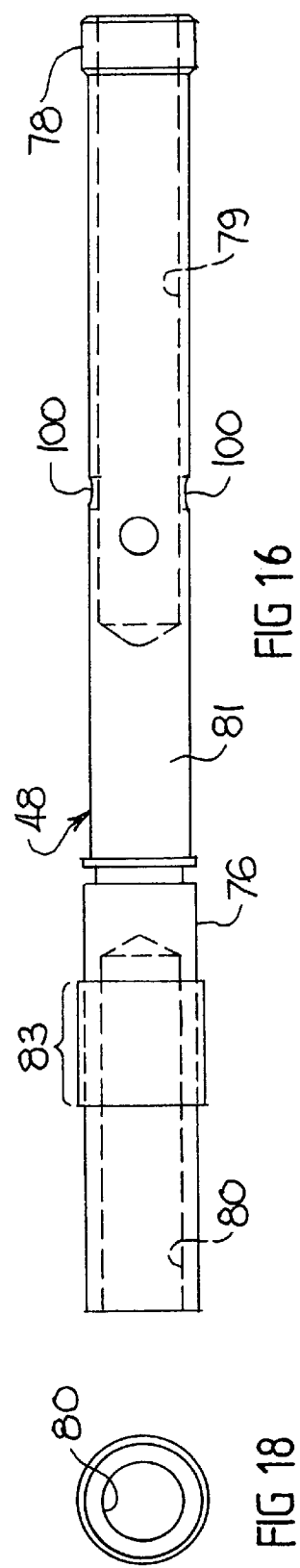

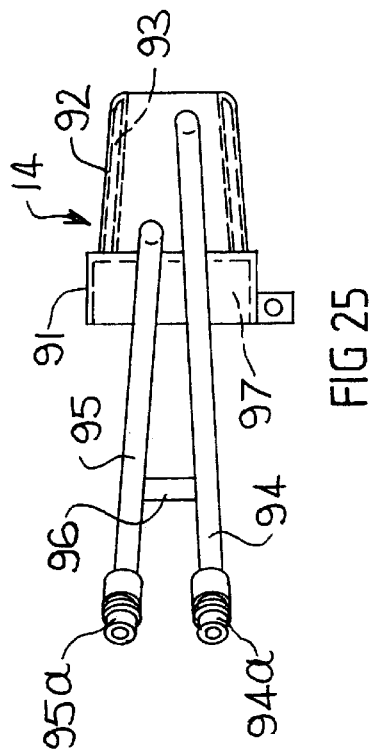
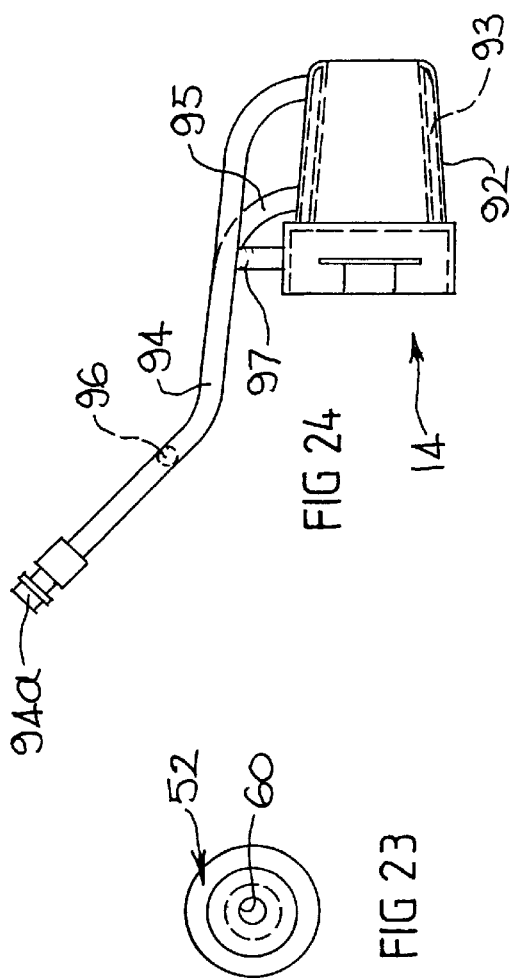
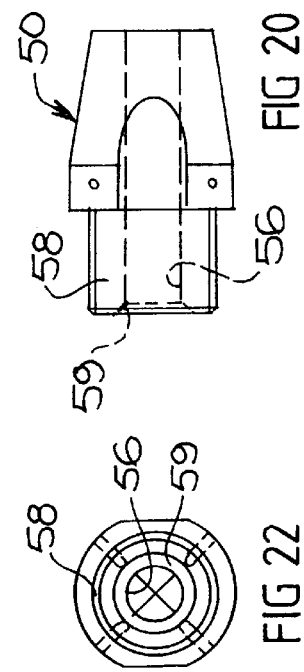
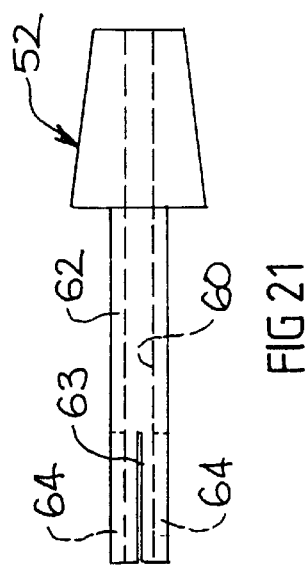

GTA WELDING

This invention relates to a process and to a welding torch for high current gas-tungsten arc (GTA) welding of metals.

Gas tungsten arc (GTA) welding (known also as tungsten inert gas, or TIG welding) is a precision welding method which has been used for many years to produce high quality joints in a wide variety of materials. It is normally used at low welding currents to weld relatively thin materials, and is a very clean process as no flux is used. When the process is used for welding thicker sections, greater than 4 mm in steels and greater than 6 mm in non-ferrous alloys, careful V- or X-type edge preparation by machining or plasma cutting is required. This edge preparation may add up to approximately 30% to the total fabrication costs, in addition to the costs of storage and handling between the machining and welding areas. In the joining of thin plates in square butt configuration, the process is usually run autogenously without the addition of filler material. When thicker elements requiring the V- or X-type machined preparations are used, filler wire is employed. Furthermore, under these conditions many passes are required to complete the joint and interpass grinding may be necessary, leading to significantly increased joint completion times. Thus, despite the high quality of joints produced by conventional GTA welding, it does not find wide application in the fabrication of thicker materials because of its poor productivity. A significant amount of research has been done on high current (500–1000 A) GTA welding in order to extend the applicability of the process and to improve its productivity. This work has been directed both towards normal elevated arc technology where the electrode tip is above the surface being welded, and to buried arc technology (also know as subsurface or immersed arc GTA welding) where the electrode tip is located below the surface of the material being welded. The advantage of the latter mode of operation is that the deep penetration obtained makes the process attractive for joining relatively thick materials (15–30 mm). However, because of the high arc forces and turbulence generated in the weld pool when operating at high currents, severe defects such as porosity, cracking, humping and inclusions are commonly observed, as well as poor mechanical properties on occasions. Although these effects are not as severe in the buried arc mode because of the shorter arc length used, commercially acceptable welding procedures have not been developed because of an imbalance between the welding conditions, the arc force, the thermal conductivity and density of metals, and convection effects in the weld pool. In addition, the practical application of high current GTA technology has been very limited owing to the unreliability of conventional welding torches. To overcome problems of these types, current densities are typically kept low by employing large diameter electrodes, for example, 9.5 mm, equating to a current density of only 12.7 A/mm$^2$ at 900 A, and high gas flow rates of about 38 1/min of Ar or 76 1/min of He are used.

The reference to current density in the immediately preceding paragraph, and throughout this specification, is based on the transverse cross-sectional electrode area.

A large number of GTA welding torches have been designed to operate at currents of approximately 350–500 A, incorporating localised chamber cooling (a small chamber at the top of the torch) and an uncooted ceramic gas shroud. During continuous operation the torch body, gas shroud and contact systems are heated significantly, thus causing reduced reliability of the torch elements and tungsten electrode. A very frequent occurrence is the loss of the electrode tip by overheating, and the resultant inclusion of tungsten in the welds. To the best of our knowledge, there is no reliable GTA torch for elevated and buried arc welding at higher currents (500–1200 A), and for use in continuous operation.

The present invention has as its objective the provision of a more productive process for GTA Welding, and an improved GTA welding torch.

We have found that significantly improved GTA welding is possible at high current levels and high current densities. For this, we have found it to be necessary to utilize a torch under conditions in which torch operating temperature stabilisation is substantially achieved. For such stabilisation, significantly improved cooling of the torch is necessary, such that the temperature of the electrode in particular is controlled.

The invention provides an improved process for welding, based on use of a GTA welding torch having a housing, typically of elongate form, with a non-consumable electrode projecting downwardly from a holder located within a gas shroud mounted on or forming part of the torch housing. As required for GTA welding, inert gas such as argon or helium is discharged downwardly from within the shroud, along the electrode, to form a necessary arc plasma jet and to protect the arc and resultant molten metal.

According to the present invention there is provided a process for welding metal workpieces wherein a gas tungsten arc welding operation is conducted utilising a welding torch including a housing; an electrode holder which is mounted on the housing so as to project therefrom, and which holds an electrode such that the electrode projects from an end of the holder remote from the housing; a shroud which is mounted on, or forms part of, the housing and which extends around but is spaced from the electrode holder; and electrically conductive means which extends within the housing and electrically connects the electrode holder to one terminal of an electric power source; and wherein the torch is connected to a source of an inert gas and generates a flow of gas through the shroud, around the electrode holder and electrode, and wherein the torch has inlet port means and outlet port means by which it is connected to a source of coolant fluid and circulates the coolant through a passage defined within the housing and extending along substantially the full extent of the conductive means, and through a passage defined within the shroud; and wherein, during the welding;

(i) the flow of inert gas is maintained through the shroud and around the electrode received in the electrode holder and electrically connected electrically conductive means, by flow of the inert gas to the housing from a suitable source and discharge of the inert gas from the housing through the shroud; and (ii) the flow of fluid coolant is maintained from at least one suitable source to provide circulation of coolant fluid through the passage of the housing, along substantially the full extent of the electrically conductive means, and to provide circulation of coolant fluid through the passage of the shroud;

with the flow of coolant controlled so that the temperature of the electrode and shroud is substantially stabilised during the welding operation, after establishing operation of the torch.

In the course of a welding operation in accordance with the process of the invention, when used to weld non-ferrous metals of at least 6 mm thick or ferrous metals of at least 4 mm thick, the torch is operated at both a high current level and a high current density. To enable this, the torch is provided with a double-walled shroud through which coolant is circulated during the welding operation. Also, the torch body is provided with a coolant passageway which extends along substantially all electrically conductive components of the body, and coolant is circulated through the passageway during a welding operation. The flow of coolant through the shroud and the passageway is controlled such that the temperature of the electrode and shroud is substantially stabilized during the welding operation.

Cooling of the shroud is beneficial in that it protects the shroud against temperature extremes prevailing at the weld site. It therefore substantially increases the operating life of the shroud—to an extent that increased manufacturing costs in providing for coolant circulation are quickly offset by savings in reduced shroud replacement costs and downtime costs, particularly in mechanised operation. However, a further important benefit of this cooling is that it substantially prevents heating of the electrode by the shroud. Indeed, cooling of the shroud can result in it being able to act as a heat sink for the torch.

Improved cooling of the electrically conducting components of the torch complements cooling of the shroud. It also reduces the effect of resistance heating of the electrode by extracting heat energy conducted to the electrically conductive elements within the torch body.

A principal benefit of cooling of the shroud and torch body is that the electrode temperature is controlled, despite operation of the torch at both high current levels and at high current densities. As a consequence, significantly enhanced welding is possible due to ongoing stable operation of the torch, as explained in more detail later herein. However, a further important benefit is that it is not necessary to recourse to high flow rates of inert gas, to achieve a degree of electrode cooling by the gas, with a resultant significant saving in the volume and cost of inert gas used.

The process of the invention enables use of current levels in excess of 450 A. However, substantially higher current levels can be used, even on a continuous basis, such as up to about 1200 A. The process also enables use of current densities in excess of about 45 A/mm$^2$, such as up to and in excess of about 60 A/mm$^2$, while producing non-turbulent weld pools.

The electrode tip used in the process of the invention preferably is of a conventional material, such as thoriated tungsten, but most preferably is lanthanated tungsten. As in conventional torches, the tip terminates at a tapered lower end. However, in contrast to the conventional tip which has an included angle of about 30°, the tip used in the process of the invention can has an included angle of from about 30° to about 60° or even as great as about 90°. The included angle preferably is from about 40° to about 50°, and most preferably about 45°. As a consequence, the electrode size used in the process of the invention can conveniently be less than about 6 mm in diameter, such as about 3.2 mm in diameter, compared with conventional electrode diameters of from about 6.4 mm to about 10 mm, while still enabling use of high current densities and maintenance of non-turbulent weld pools.

Electrode tip heating results, in part, from resistance heating due to current flow. To minimise adverse consequences due to such heating, the electrode tip stickout most conveniently is small compared with conventional practice. The stickout, i.e. the electrode tip length beyond its holder, may be kept to a minimum, such as from about 4 to 15 mm, preferably from about 4 to 10 mm, and more preferably from about 6 to 12 mm, such as from 6 to 9 mm or 8 to 12 mm.

The high current levels and current densities enabled in the process of this invention have substantial benefit in both metal thicknesses able to be welded, and in the quality of weld obtained. With ferrous and non-ferrous metals, it is possible by the process of the invention to weld components of significantly greater thickness than with known GTA welding procedures. The process is very well suited for welding components of structural steels and stainless steels up to at least 16 mm thick, and aluminium alloys up to at least 25 mm thick. Additionally, in a welding operation to join components, there is no requirement to machine or grind an edge preparation, as components can be welded together such as in a square butt configuration. Also surfaces, at which components are to be joined by welding, can be such as obtained by flame or plasma cutting.

Some benefits of being able to weld ferrous and non-ferrous components of up to about 25 mm thick, in a square butt configuration, readily will be appreciated. One benefit of course is that it obviates the time and cost involved in providing an edge preparation. However, it also enables a welded joint to be completed without the need for filler material, although a small amount of such material may sometimes be used for metallurgical alloying purposes. Also, a flat bead surface, substantially co-planar with adjacent component surfaces in the case of sheet metal, can be achieved, thereby eliminating the requirement for post-weld grinding. Moreover, improvement in the fatigue resistance of welded joints is made possible by the absence of a stress-raising bead reinforcement.

While the process of the invention enables a welded joint between components of up to about 25 mm thick in a square butt configuration, it is to be understood that such configuration need not be used. That is, an edge preparation can be provided, if required, although this of course will necessitate use of filler material. However, it also is to be understood that edge preparation can be used to advantage in providing a welded joint between components substantially thicker than 25 mm.

With, for example, plate sections of about 25 mm thick, a welded joint can be formed between them in a square butt configuration, by the process of the invention, in two passes—one run each side. The weld root for each pass will be slightly beyond a medial plane of the sections. With plate sections of about 30 mm thick and a V-type edge preparations at a common face of each, two passes again will enable a welded joint to be formed between the base of the edge preparation to the other face of each plate, after which at least one further pass with use of filler material will enable completion of the welded joint along the edge preparation.

While enabling a welded joint between components up to, and in excess of 25 mm thick, the invention can be used for welding thin components, such as ferrous components down to, or below, 4 mm thick and non-ferrous components down to, or below, 6 mm thick. However, it principally is in relation to ferrous and non-ferrous components in excess of 4 mm and 6 mm, respectively, that the process of the invention has maximum benefit, particularly in obviating the need for edge preparation and a large number of passes. Thus, in the context of its principal application, the process enables the welding of components of a thickness in excess of those respective limits, such as from 6 to at least 25 mm thickness, without edge preparation over such edge thickness, using a current level in excess of 450 A at a current density in excess of 45 A/mm$^2$.

Despite the use of high current levels and current densities, the process of the invention enables welding under stable, substantially constant conditions, even over long periods of operation. Control over heat energy, by efficient cooling within the torch body and shroud enables the electrode to be maintained at a relatively low temperature, and within a relatively narrow temperature range. That is, there is a good overall balance in welding conditions and convention effects in the weld pool do not detract significantly from this. Also, the process does not depend on high flow rates of inert gas for electrode cooling, and the adverse effects of the force exerted by the GTA plasma jet are minimized.

The process of the invention is well suited to automated welding, utilizing a programmed drive or robotic system to maintain the torch in a constant relationship to a work-piece being welded, during movement of the torch. Automated welding has been proposed for conventional GTA welding torches, although the precision possible with a drive or robotic system is essentially negated with such torches unless they are used for welding of thin sections at low current levels and densities. In contrast, the stable operation permitted by the process of this invention is much more compatible with the precision of such systems, enabling excellent and reproducible automated welding of substantially thicker work-pieces than can be welded using conventional GTA torches.

The present invention also provides an improved GTA torch, suitable for use in the process of the invention.

Thus the invention provides a welding torch for gas tungsten arc (tungsten inert gas) welding; wherein the torch includes a housing; an electrode holder which is mounted on the housing so as to project therefrom, and which is adapted to hold an electrode such that the electrode projects from an end of the holder remote from the housing; a shroud which is mounted on, or forms part of, the housing and which extends around but is spaced from the electrode holder; and electrically conductive means extending within the housing for electrically connecting the electrode holder to one terminal of an electric power source; wherein the torch is adapted for connection to a source of an inert gas for generating a flow of gas through the shroud, around the electrode holder; and wherein the torch has inlet port means and outlet port means by which it is adapted for connection to a source of coolant fluid for circulation of the coolant through a passage defined within the housing and extending along substantially the full extent of the conductive means, and through a passage defined within the shroud.

In one practical form, the torch of the invention has an elongate housing, with the electrode projecting from one end of the housing, within a double-walled water-coolable gas shroud. Extending longitudinally within the housing, there are electrically conductive components for holding, and conducting electric power to, the electrode. The housing is adapted for water-cooling of those components, such as around and in close proximity to the components, and preferably over a major part of their extent within the housing.

Thus, in a preferred form the invention provides a welding torch for gas tungsten arc (tungsten inert gas) welding, including:

(a) an elongate housing which has a working end and a non-working end, wherein the housing has an outer tubular sleeve and an inner tubular sleeve each of which extends between a respective closure means at each end of the housing such that a passageway is defined around the inner sleeve between those ends, and wherein a bore through the housing is defined by the inner sleeve and each closure means;

(b) an electrode holder, mounted at the working end of and projecting from the housing, which defines a bore therethrough such that an elongate electrode is receivable into the electrode holder so as to extend end-wise into the bore of the housing;

(c) a tubular gas shroud, mounted at and projecting from the working end of the housing, such that a gas discharge space is defined therein around the electrode holder, wherein the shroud is of double-wall construction to define a passageway therein, around the electrode holder; and (d) electrically conductive means extending within the bore of the housing from the non-working end, for releasably connecting an electrode received in the bore of the electrode holder to a terminal of an electric power source; wherein the torch is further characterised in that:

(i) the electrically conductive means projects beyond the non-working end of the housing so as to be adjustable for releasably gripping the electrode;

(ii) the torch is adapted for connection to at least one source of coolant fluid for circulation of coolant fluid through the passageways defined by the housing and the shroud; and (iii) the torch is adapted for connection to a source of inert gas for flow of the gas along the bore of the housing and discharge of the gas, at the working end of the housing, through the discharge space defined in the shroud.

The electrically conductive components preferably are within a metal sleeve which extends longitudinally through the housing, over substantially the full length of the housing between its working and non-working ends. The metal sleeve is in good thermal contact with the electrode holder, to facilitate extraction of heat energy from the holder. A water-flow chamber is defined around the metal sleeve such that water circulated through the chamber is able to extract heat energy from the sleeve, to thereby maintain the electrode and its holder at a substantially constant, relatively low operating temperature. The electrode holder is of metal, and preferably is of large mass relative to the electrode, so that it is able to function as a heat sink for the electrode and facilitate the transfer of heat energy from the electrode to the circulated water.

The water-flow chamber preferably is of annular form around substantially the full length of the sleeve. Cooling water preferably is discharged into the chamber adjacent the working end of the housing so as to flow along the sleeve for discharge at the non-working end. In one arrangement, the water is discharged into the chamber via a conduit which extends longitudinally therein, from an inlet port adjacent to the non-working end of the housing.

Inert gas for discharge within the shroud may pass along the length of the housing, within the metal sleeve. The shroud is cooled by a circulating supply of water which preferably is independent of water circulated within the housing for cooling of the electrically conductive components. The shroud preferably has inlet and outlet ports for its coolant water. The inlet port preferably is closely adjacent the lower end of the shroud, such that the water flows therein from that port, back towards the non-working end of the housing, for discharge from the outlet port of the shroud. The shroud preferably is of frusto-conical form, tapering towards its lower end, and preferably is adapted for flow of coolant water therein through its full circumferential extent.

In order that the invention can more readily be understood, reference now is directed to the accompanying drawings, in which:

FIG. 13 shows details of an inner barrel of the torch of FIG. 9;

FIGS. 14 and 15 show respective end elevations of the inner barrel;

FIGS. 16 and 17 show details of a collet closer and a collet of the torch of FIG. 9;

FIGS. 18 and 19 show a respective end elevation of the components of FIG. 16 and 17;

FIGS. 20 and 21 show details of contact tip components of the torch of FIG. 9;

Figure 9:
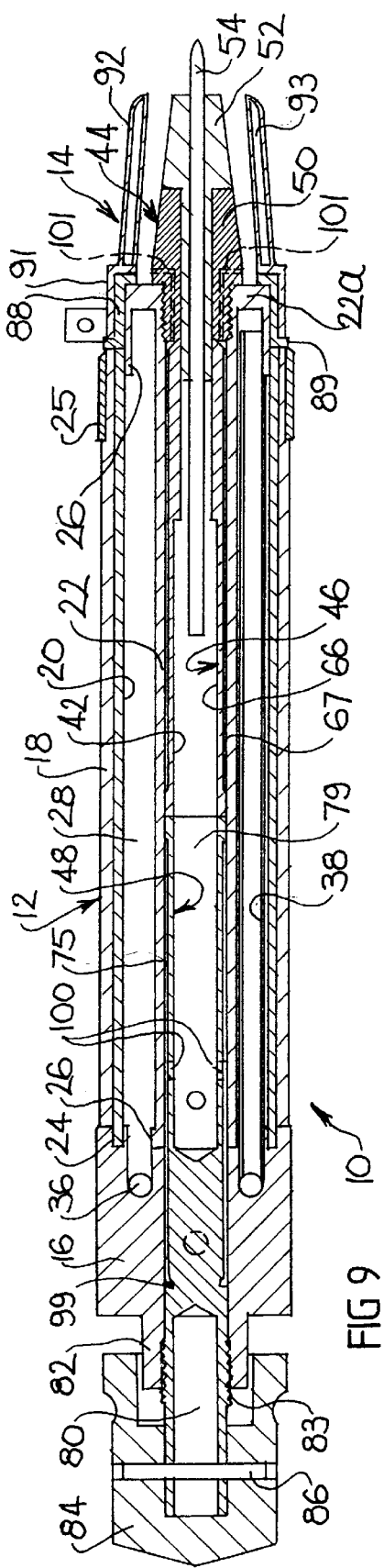
FIG. 9 shows in axial section a GTA welding torch according to the invention.
Figure 12:
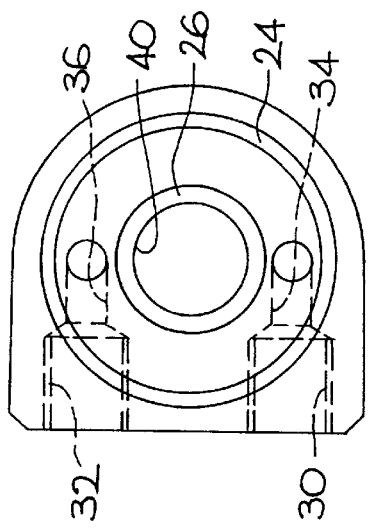
FIGS. 11 and 12 show respective end elevations of the manifold body.

FIGS. 22 and 23 show a respective end elevation of the components of FIGS. 18 and 19; and FIGS. 24 and 25 show a side elevation and plan view of the gas shroud of the torch of FIG. 9.

The GTA welding torch 10 of FIG. 9 has an elongate cylindrical housing 12 having a gas shroud assembly 14 at one end (the working end). At its end remote from shroud assembly 14 (the non-working end), housing 12 has a manifold body 16 which preferably is of a metal providing good thermal conduction, such as brass. Between manifold body 16 and shroud assembly 14, torch housing 12 has an external insulation sleeve 18, an outer barrel 20, and an inner barrel 22.

Sleeve 18 and barrel 20 are cylindrical. Barrel 20 is of a metal providing good thermal conduction, such as brass, and has its end adjacent the non-working end of housing 12 firmly received in an annular groove 24 of manifold body 16. Sleeve 18 is of bakelised paper and is received on barrel 20 in a neat sliding fit. A band 25 of a metal providing good thermal conduction, such as brass, is provided around the end of sleeve 28 adjacent to the working end to protect sleeve 18 from potential burning by radiation from the arc.

Inner barrel 22, as shown in FIG. 13, is of generally cylindrical form, and also is of a metal providing good thermal conduction, such as brass. Adjacent to the non-working end of housing 12, barrel 22 is firmly received onto annular, stepped extension 26 of manifold body 16.

Barrel 22 is radially spaced from barrel 20 to define an annular chamber 28 therebetween. Adjacent to the working end of housing 12, chamber 28 is closed by an annular collar 22a and concentric sleeve portion 22b of barrel 22. Collar 22a extends radially outwardly from the main extent of barrel 22, while sleeve portion 22b extends from collar 22a, towards the non-working end of housing 12, to be sealingly received within the end of outer barrel 20.

Figure 10:
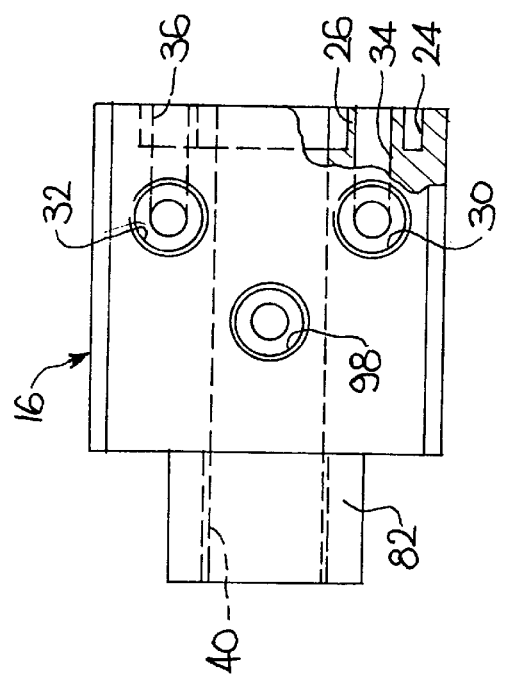
FIG. 10 shows a manifold body of the torch of FIG. 9.
Figure 11:
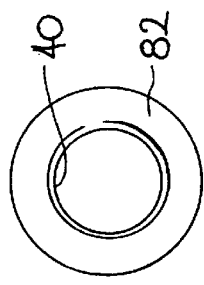

Manifold body 16 and barrels 20, 22 enable cooling of housing 12, by circulation of cooling water through chamber 28. As shown in FIG. 10, manifold body 16 has threaded inlet and outlet ports 30,32 to which water flow conduits are connectable for the supply and return of cooling water. From each of ports 30,32, there is a respective passageway 34,36 which communicate with chamber 28. Received end-wise in the inlet passageway 34 to chamber 28, there is a pipe 38, of a metal providing good thermal conduction, such as copper, which extends along chamber 28 to a position just short of collar 22a of inner barrel 22. Thus, with ports 30,32 connected to water supply and return conduits, cooling of housing 12 is achieved by flow of water from port 30 and passageway 34, along pipe 38 for discharge into chamber 28, and back along chamber 28 for discharge via passageway 36 and port 32.

Manifold body 16 defines an axial bore 40 which is of substantially the same diameter as an axial bore 42 defined by inner barrel 22. There thus is a substantially uniform axial bore through the length of housing 12. Within that bore there is mounted the electrically conductive components of torch 10, electrically connected to an electrode assembly 44 at the working end of housing 12, and consisting of collet 46 and a collet closer 48. Description now is directed to those components.

Electrode assembly 44 has a contact tip 50, a contact collet 52, and a tungsten tip (electrode) 54 of elongate rod form. Contact tip 50 is of a metal providing good thermal and electrical conductivity, such as copper, and as shown in FIG. 18, is of annular form, defining an axial bore 56 in which collet 52 is received. Externally, contact tip 50 tapers frusto-conically away from the working end of housing 12. Within that working end, tip 50 is stepped to define an axial shank 58 which is externally threaded, and in screw-threaded engagement with a threaded portion of bore 42 of inner barrel 22. The end of shank 58 within housing 12 is counter-bored to provide a frusto-conical inlet 59 to bore 56.

Contact collet 52 also is of a metal providing good thermal and electrical conduction, such as copper. As shown in FIG. 19, it also is of annular form and defines an axial bore 60 in which tungsten electrode 54 is received. Externally, collet 52 tapers frusto-conically away from the working end of housing 12, to provide a continuation of the taper of contact tip 50. Collet 52 also is externally stepped to define an elongate axial shank 62 which extends through and beyond bore 56 of contact tip 50, into the interior of housing 12. Shank 62 is a firm friction fit in bore 56 such that contact tip 56 and collet 52 function as a unit. However, bore 60 is dimensioned to receive a tungsten electrode 54 of a given diameter and collet 52 can be removed from tip 50, when required, to enable its replacement by an externally similar collet 52 having a bore 60 sized for a tungsten electrode 54 of different diameter.

At the end of its shank 62 within housing 12, collet 52 has axial slits 63 to define radially flexible fingers 64. Application of pressure to fingers 64 results in tungsten electrode 54 being gripped, and held with a required extension beyond collet 52, away from housing 12.

Collet 46 is of a metal providing good thermal and electrical conduction, such as brass, and also is of annular form. As shown in FIG. 17, collet 46 defines a bore 66 and, over a major part of its length away from assembly 44, is of lesser diameter than bore 42 of inner barrel 22 to define an annular clearance 67 therebetween. However, collet 46 is a neat sliding fit in bore 42 of inner barrel 22 by provision of an annular land 68 around its end remote from assembly 44. With assembly 44 positioned, collet 46 is introduced into bore 42 via the non-working end of housing 12, and then moved axially into position by introducing collet closer 48.

At its end adjacent to assembly 44, collet 46 has axial slits 70 to define collet fingers 72. The diameter of bore 66, along the length of fingers 72 is such that fingers 72 are neatly received onto fingers 64 of contact collet 52. Also, the ends of fingers 72 adjacent to assembly 44 are tapered to define end shoulders 74 which are able to be received in and abut against counter-bored inlet 59 of bore 56 of contact tip 50. Thus, as collet 46 is urged axially against assembly 44, fingers 72 are caused to flex radially inwardly, thereby similarly flexing fingers 64 and causing tungsten electrode 54 to be gripped and securely held.

The angular extent of fingers 64,72 and of the respective slits 63,70 between these, is such that each finger 72 is radially aligned with at least one finger 64. The width of the slits 63,70 is such that fingers of one set can not interdigitate with those of the other set.

Collet closer 48 is of a metal providing good thermal and electrical conductivity, such as brass. As shown in FIG. 16, collet closer 48 has a cylindrical external surface which, over a major part of its length, is of lesser diameter than bore 40 of manifold body 42 and bore 36 of inner barrel 22, to define annular clearance 75 therearound. From each end, closer 48 defines axial counter-bores 79,80 and has a solid body portion 81 between counter-bores 79,80. The length of closer 48 which defines counter-bore 79 is received within inner barrel 22 and has an end face which abuts against an end face of collet 46. As shown, the abutting faces of closer 48 and collet 46 are of complementary, frusto-conical form, although this is not necessary. The length of closer 48 which defines counter-bore 80 extends from within manifold body 16, and beyond the non-working end of housing 12.

Manifold body 16 has an axial boss 82 which extends beyond the non-working end of housing 12, and in which bore 40 is threaded. Also, the length of collet closer 48 which defines counter-bore 79 is externally threaded at 83 for threaded engagement in bore 40. Mounted on the end of closer 48 remote from housing 12, there is a cup-shaped locking knob 84 of insulating material such as ebonite. A laterally extending pin 86 is inserted through aligned lateral bores of knob 84 and closer 48, to secure knob 84 and closer 48 against relative rotation. Thus, by gripping and rotating knob 84, it is possible to axially advance or retract closer 48 due to the threaded engagement of closer 48 in boss 82. This axial movement of closure 48 respectively causes or enables corresponding movement of collet 46, and thereby flexing or unflexing of fingers 72 and thus fingers 64, to secure or release tungsten electrode 54.

At the working end of housing 12, an annular insulator 88, such as of Teflon, is mounted on the end portion of inner barrel 22 which extends axially beyond outer barrel 20. Insulator 88 completes insulation of outer barrel 20, and has a radial flange 89 which extends radially outwardly to abut against the adjacent end of insulation sleeve 18. Also, a radially inwardly extending flange 90 extends across the end face of barrel 22. Gas shroud assembly 14 is mounted on insulator 88.

Shroud assembly 14, shown in FIGS. 22 and 23, is of a thermally conductive metal, such as brass, and is of annular form. Assembly 14 has a stepped annular body 91 by which it is mountable on insulator 88, and a double-walled, frusto-conical shroud 92 which tapers in the same direction as electrode assembly, but at a slightly lesser angle. The double-wall of shroud 92 defines an annular chamber 93 through which coolant water is able to be circulated. Communicating with chamber 93, shroud assembly 14 has inlet and outlet connector tubes 94,95, each having a connector 94a,95a for respectively coupling to water supply and return conduits. Tubes 94,95 are cross-braced by a connector 96 therebetween, and by a brace 97 between inlet tube 94 and body 91. Inlet tube 94 communicates with chamber 93 at the end of shroud 92 remote from housing 12, with coolant water flowing rearwardly therefrom for discharge via tube 95.

Inert gas required for GTA welding is discharged within shroud 92, for flow longitudinally beyond the end of tungsten electrode 54 towards a weld site. The gas is supplied to torch 10 by connecting a conduit from a suitable source to inlet port 98 of manifold body 16.

From port 98, the gas passes into and around annular clearance 75 defined between inner barrel 22 and collet closer 48. The gas is prevented from passing beyond the non-working end of housing 12 by an O-ring seal 99, and is constricted so as to flow into counter-bore 79 via ports 100 of closer 48. From counter-bore 79, the gas flows along the bore 66 of collet 46, and then through the slits 70 between fingers 72 of collet 46 and into the annular clearance 67 between collet 46 and barrel 22. From clearance 67, the gas is able to pass through passageways 101 of contact tip 50, for discharge along electrode 54, within shroud 92.

Torch 10 can be adapted for operation using an AC power supply, but it preferably is operable on a DC power supply. As is conventional, torch 10 most preferably is used in a direct current electrode negative mode, i.e. with tungsten tip negative and a work-piece to be welded made positive. However, it can operate in the converse mode of direct current electrode positive, if required. DC power connection to torch 10 preferably is by means of a power lead connection to manifold body 16, such as to an electrically conductive conduit connected to port 30 for the supply of cooling water. Between manifold body 16 and electrode 54, the current flow path is defined by collet closer 48, collet 46 and collet 52. Good electrical contact between manifold body 16 and collet closer 48 is provided by the threaded engagement therebetween within boss 82. Collet closer 48 is in good electrical contact with collet 46 by means of the abutting end faces thereof. Good electrical contact between collet 46 and electrode 54 results from radially inward flexing of its fingers 72 onto fingers 64 of contact collet 52, and resultant gripping of electrode 54 by fingers 64. The axial position of collet closer 48 is adjustable by rotation with knob 84, to ensure good contact at each stage of the current flow path within torch 10.

As will be appreciated from the description, torch 10 is operable under conditions in which shroud 92 is maintained at a relatively low, controlled temperature by flow of coolant water through chamber 93. Additionally, electrically conductive components, comprising assembly 44, in particular tungsten electrode 54, as well as collet 46 and collet closer 48 are maintained at a relatively low, controlled temperature, by flow of coolant water through chamber 28, along substantially the full axial extent of those components. Thus, heating of tungsten tip is able to be quickly stabilized at an equilibrium level, despite extended operation, enabling maintenance of a stable arc and essentially constant welding conditions, even during prolonged use.

The combination of contact tip 50 and collet 52 of assembly 44 provides an efficient heat sink for electrode 54. That is, in combination, the mass of tip 50 and collet 52 is substantial relative to electrode 54, and thus facilitate extraction of heat energy from electrode 54. Also, contact tip 50 is in good thermal contact with inner sleeve 22, such that extracted heat energy is able to be efficiently transferred to sleeve 22 and, from the latter, to circulated coolant water in chamber 28. The action of this cooling system, in combination with the cooling effect of water circulated through chamber 93 of shroud 14, is such that electrode 54 is able to be maintained at a relatively low, substantially constant operating temperature. Indeed, even after prolonged periods of operation, at least sleeve 18 is maintained at a temperature enabling it to be safely hand held.

In order to further illustrate the process and torch of the invention, description now is directed to the following specific Examples. In the Examples, the torch used was essentially as shown and described with reference to FIGS. 9 to 25.

EXAMPLE 1

Two 12 mm thick plates of AS3678:250 C-Mn steel were welded together under the following conditions:

| | |
|---|---|
| Joint preparation | square butt, flame cut |
| Welding conditions | current - 500 A |
| | voltage - 12.5 V |
| | welding speed - 250 mm/min |
| | shielding gas - Ar |
| | gas flow rate - 20 l/min |
| Number of passes | two - one on each side |
| Electrode | type - lanthanated tungsten |
| | diameter - 3.2 mm |
| | included angle - 45° |
| Filler Material | AWS A5.18 wire (as alloying addition only) |

Figure 1:
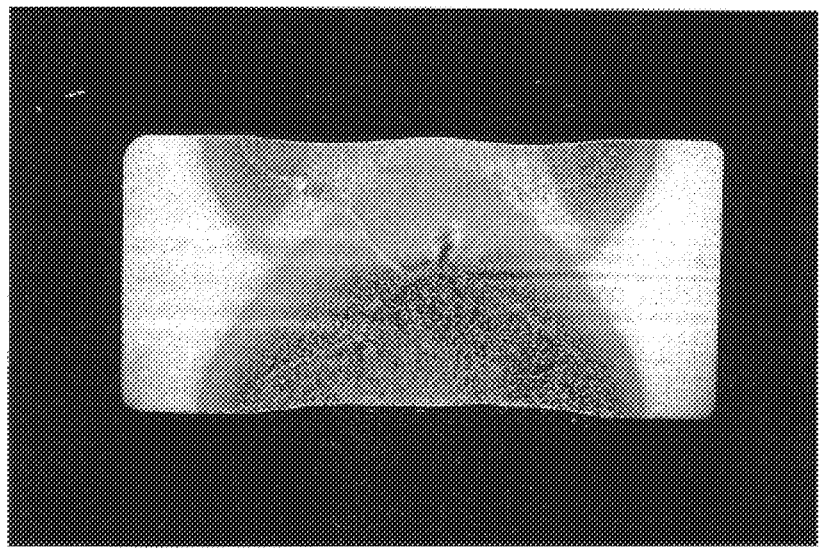
FIG. 1 is a macrophotograph taken on a cross-section of a C-Mn steel plate produced in a first Example of the invention.
Figure 2:
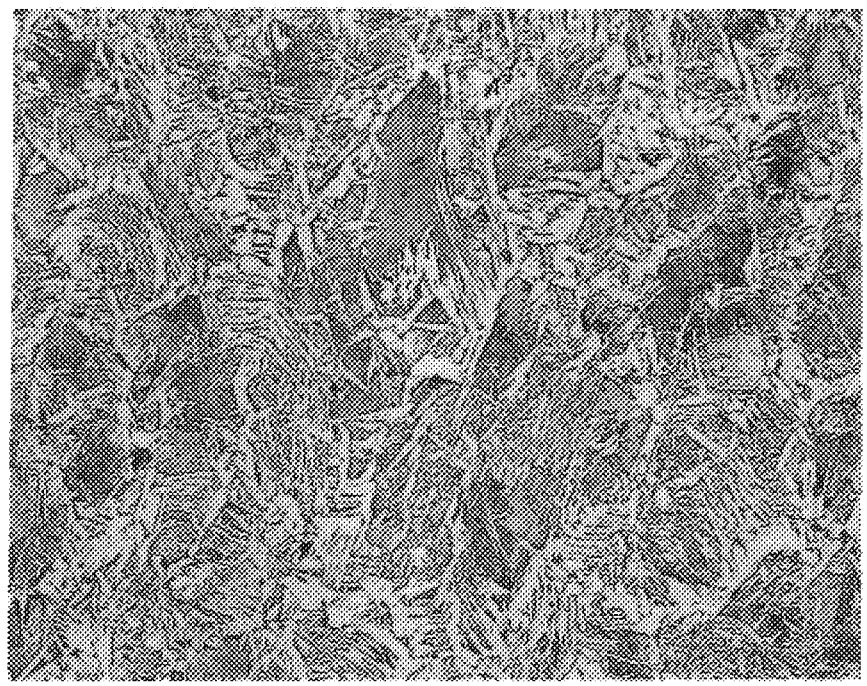
FIG. 2 is a microphotograph of the weld of FIG. 1.

FIG. 1 is a macrophotograph (×2.5), showing the weld bead and heat-affected zone at a cross-section of the resultant plate. FIG. 2 is a microphotograph (×200) of the weld bead of the plate. FIG. 1 shows the weld to have a substantially flat bead surface which does not require post-weld grinding; while it also shows by the overlapping beads that bars in excess of 12 mm thick can be welded. FIG. 2 shows grain boundary nucleated aligned ferrite with bainite (dark etching). The bead was found to have good mechanical properties, as illustrated by Charpy V-notch impact toughness of 80 J for the weld metal and 123 J for the heat-affected zone.

EXAMPLE 2

Two 12 mm thick plates of AISI-304L stainless steel, were welded together to provide a plate of 12 mm thick by about 25 mm wide. The welding conditions were:

| | |
|---|---|
| Joint preparation | square butt, plasma cut |
| Welding conditions | current - 500 A |
| | voltage - 13 V |
| | welding speed - 150 mm/min |
| | shielding gas - 75% He, 25% Ar |
| | gas flow rate - 20 l/min |
| Number of passes | two - one on each side |
| Electrode | type - lanthanated tungsten |
| | diameter - 3.2 mm |
| | included angle - 45° |
| Filler Material | Grade 316L flux cored wire (as allowing addition only) |

Figure 3:
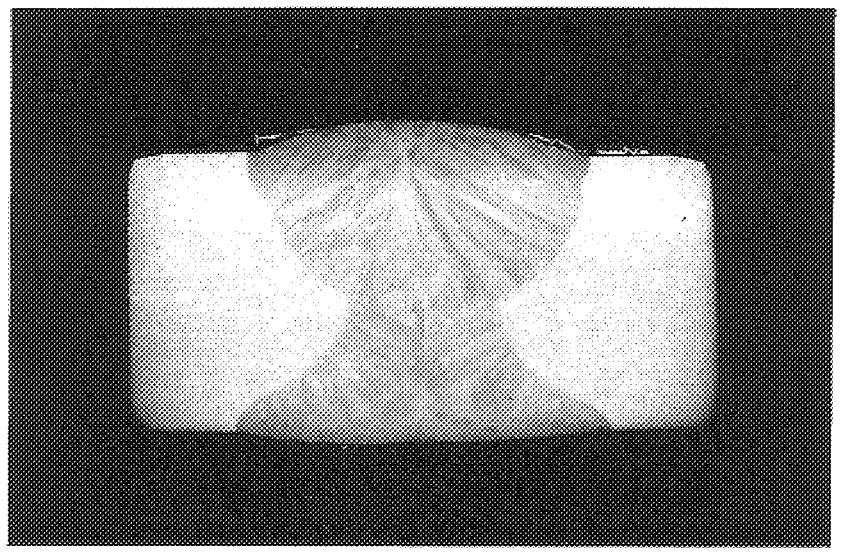
FIG. 3 is a macrophotograph as in FIG. 1, but of a stainless steel plate produced in a second Example.
Figure 4:
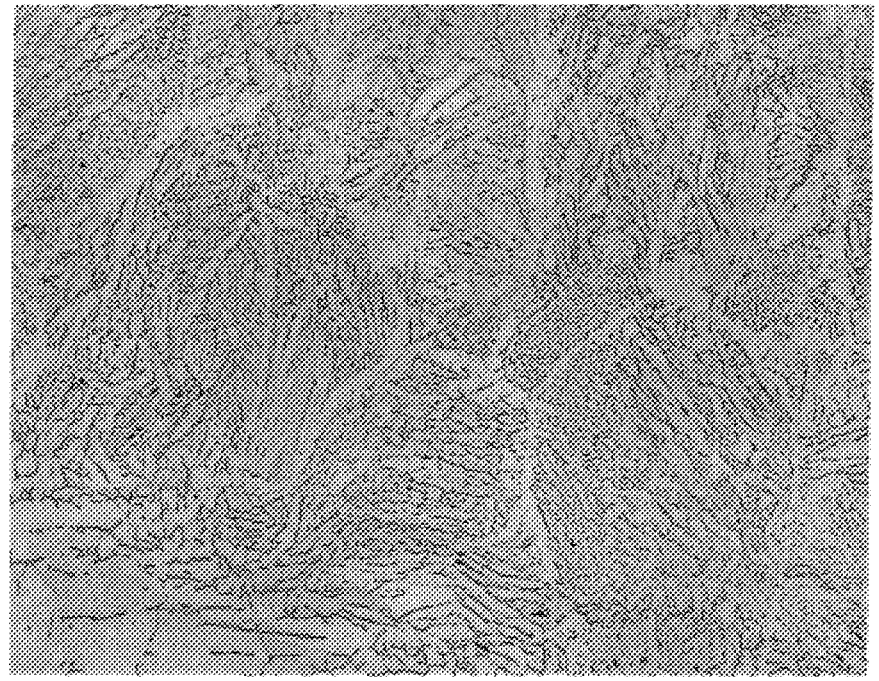
FIG. 4 is a microphotograph on the fusion line area of the weld of FIG. 3.

FIG. 3 is a macrophotograph (×2.5) taken on a cross-section of the resultant plate, showing the weld bead structure. As evident from FIG. 3, the joint quality is good, being defect free with a smooth surface quality. FIG. 4 is a microphotograph (×200) taken on the fusion line area in the resultant plate, and shows austenite with ferrite in a cellular-dendritic region (right hand side) in the weld metal.

EXAMPLE 3

Two 5 mm thick plates of duplex stainless steel UNS31803 were welded together in edge-to-edge relationship under the following welding conditions:

| | |
|---|---|
| Joint preparation | square butt, plasma cut |
| Welding conditions | current - 220 A |
| | voltage - 12.5 V |
| | welding speed - 150 mm/min |
| | shielding gas - Ar |
| | gas flow rate - 20 l/min |
| Number of passes | two - one on each side |
| Electrode | type - lanthanated tungsten |
| | diameter - 3.2 mm |
| | included angle - 45° |
| Filler Material | none |

Figure 5:
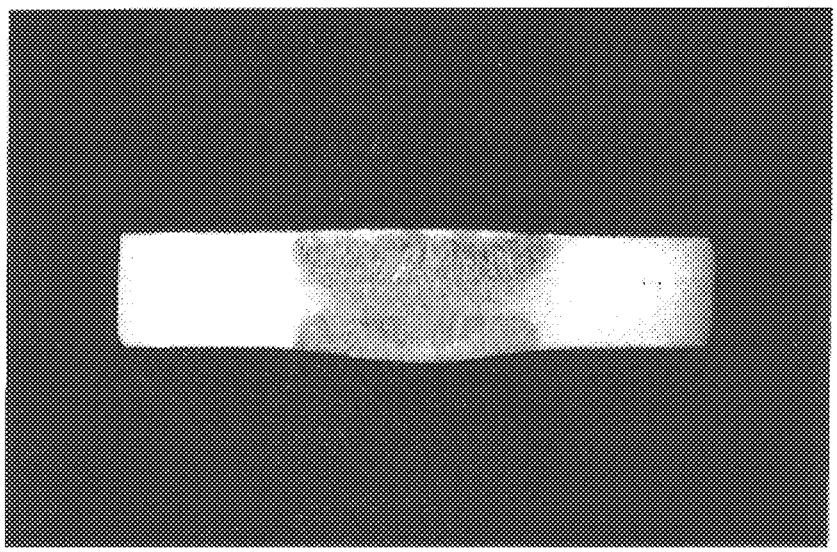
FIG. 5 is a macrophotograph as in FIG. 1, but of a duplex stainless steel plate produced in a third Example.
Figure 6:
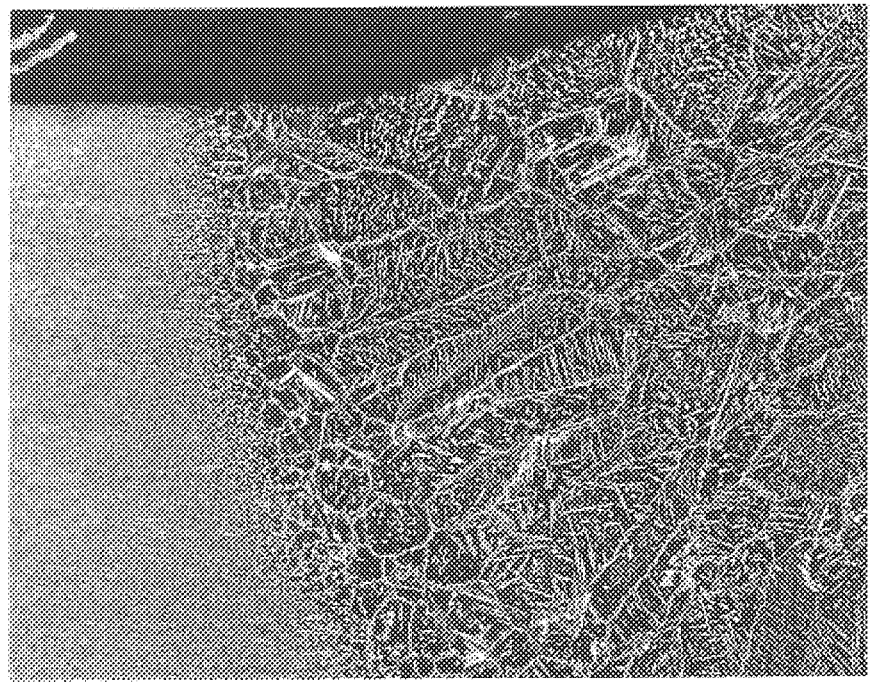
FIG. 6 is a microphotograph of the weld region of FIG. 5.

FIG. 5 is a macrophotograph (×3) taken on a cross-section of the resultant plate, and shows the weld bead structure. As shown, the plates were welded with a defect-free weld joint, with very smooth bead appearance. FIG. 6 is a microphotograph (×50) of the weld region and shows large grains of ferrite, with grain boundary austenite (right hand side).

EXAMPLE 4

Two 25 mm thick plates of Aluminium Association International Alloy 5083-Al-Mg were welded together at their edges. The welding conditions were:

| | |
|---|---|
| Joint preparation | square butt, plasma cut |
| Welding conditions | current - 360 A |
| | voltage - 17.5 V |
| | welding speed - 110 mm/min |
| | shielding gas - He |
| | gas flow rate - 30 l/min |
| Number of passes | two - one on each side |
| Electrode | type - lanthanated tungsten |
| | diameter - 3.2 mm |
| | included angle - 45° |
| Filler Material | none |

Figure 7:
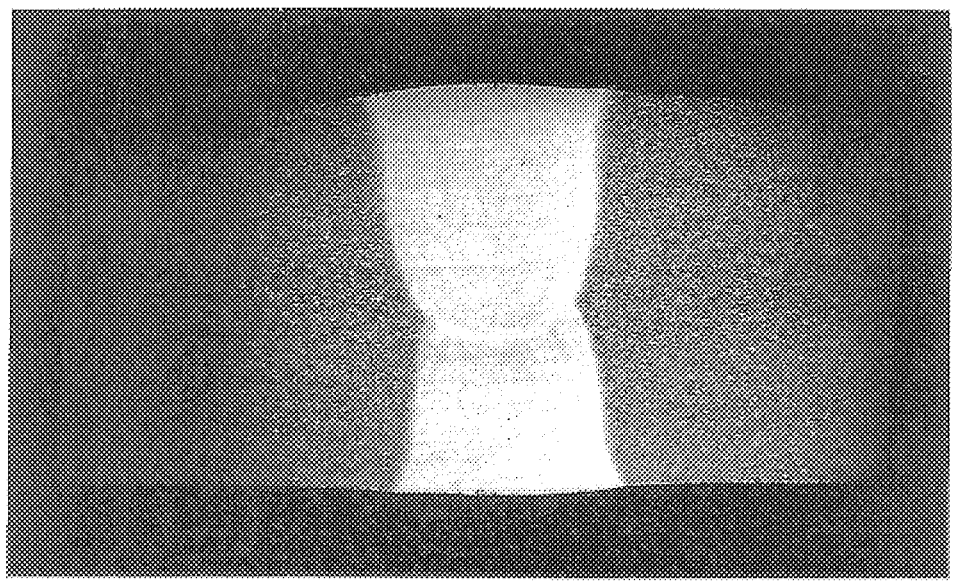
FIG. 7 is a macrophotograph as in FIG. 1, but of an aluminium alloy plate produced in a fourth Example.
Figure 8:
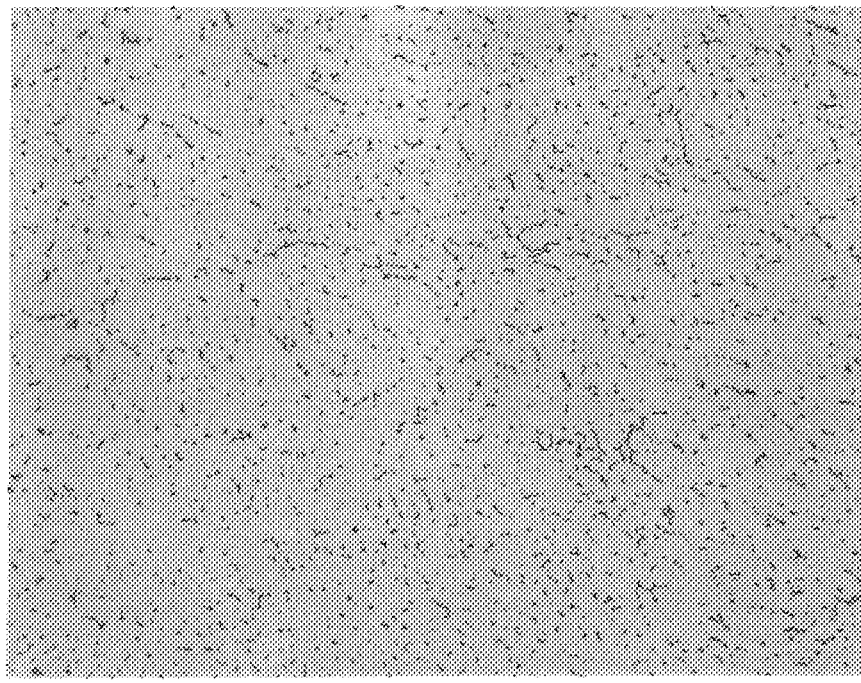
FIG. 8 is a microphotograph of the weld region of FIG. 7.

FIG. 7 is a macrophotograph (×3.2) on a cross-section of the welded plate. Again, this shows a defect-free joint with smooth bead appearance, and also a very narrow heat-affected zone. The joint was found to have a tensile strength of 302 MPa. FIG. 8 is a microphotograph (×200) of the weld region of the plate, showing distributed intermetallics in solidification cell boundaries.

Finally, it is to be understood that various alterations, modifications and/or additions may be introduced into the constructions and arrangements of parts previously described without depart from the spirit or ambit of the invention.

We claim:

1. A welding torch for gas tungsten arc (tungsten inert gas) welding; wherein the torch includes a housing which has an elongate form between a working end and a non-working end thereof and which has a double-walled construction, from the working end to the non-working end, having an outer peripheral wall and an inner peripheral wall with an annular passage defined between said peripheral walls; and annular shroud which is mounted on the housing at the working end thereof so as to project from the housing, beyond said working end; an electrode holder which is mounted on the housing at the working end thereof so as to project therefrom, beyond said working end, within but spaced from the shroud, and which is adapted to hold an electrode whereby the electrode projects from an end of the holder remote from the housing; and electrically conductive means extending within the housing to the electrode holder, whereby the electrode holder is electrically connectable to a terminal of an electric power source; wherein the torch is adapted for connection to a source of an inert gas for generating a flow of gas through the shroud, around the electrode holder; wherein the torch has inlet port means and outlet port means by which it is adapted for connection to a source of coolant fluid for circulation of the coolant through said annular passage defined within the housing and extending along substantially the full extent of the conductive means, and through a passage defined within the shroud; and wherein said end of the electrode holder remote from the housing is at or adjacent an opening defined by an end of the shroud remote from the housing whereby, with an electrode provided in the holder, a working portion of the electrode projecting from the electrode holder, beyond the opening of the shroud is able to be of a minimum length of from 4 to 15 mm: and wherein the housing is formed of a metal of high thermal conductivity and the electrically conductive means and the electrode holder are formed of a metal of high thermal and high electrical conductivities, with an inner end portion of the electrode holder located within and in good thermal contact with the inner peripheral wall of the housing and the electrode is in good thermal and electrical contact with the electrode holder from within the inner peripheral wall to the end of the holder remote from the housing.

2. A torch according to claim 1, wherein the inlet and outlet port means comprise a respective inlet and outlet port of each of the housing and the shroud such that circulation of coolant through the passage defined within the shroud is independent of circulation of coolant through the passage defined within the housing.

3. A torch according to claim 1 wherein fluid is supplied to, and returned from, the annular passage defined in the housing at or adjacent to the non-working end.

4. A torch according to claim 3, wherein circulation of coolant in the annular passage defined by the housing initially is via a conduit extending longitudinally therein towards the working end and then towards the non-working and exteriorly of the conduit.

5. A torch according to claim 1, wherein the electrically conductive means extends through a bore defined within the inner wall.

6. A torch according to claim 1, wherein the electrically conductive means is adapted for electrically connecting the electrode holder to said terminal by:
an electrical coupling between the electrically conductive means and the electrode holder,
an electrical coupling between the electrically conductive means and the housing, and
a connector on the housing adapted for connection to said terminal.

7. A torch according to claim 6, wherein an electrically non-conductive material is provided over the external surface of the housing so as to provide protection for a user.

8. A torch according to claim 1, wherein the shroud is of a double wall construction to provide an outer peripheral wall and an inner peripheral wall; and wherein the passage defined by the shroud is between the inner and outer walls thereof.

9. A torch according to claim 8, wherein the torch is adapted for circulation of coolant in the passage defined by the shroud by flow of the coolant therein from an end of the shroud which is remote from the housing, towards the housing.

10. A torch according to claim 1, wherein the electrode holder has a shank portion which is received in the housing and a body portion which projects from the housing; and wherein the electrode holder defines a bore into which an elongate electrode is receivable end-wise for electrical connection to the electrically conductive means.

11. A torch according to claim 10, wherein the shank of the contact holder has a length greater than the length of the bore of the contact tip, so as to project therefrom into the interior of the housing; the shank of the contact holder defines collet fingers at its end remote from its body; the electrically conductive means includes actuator means which extends from the collet fingers and projects outwardly from the housing; and wherein the actuator means is manually adjustable, exteriorly of the housing, to cause the collet fingers to flex to releasably grip an electrode received into the electrode holder and thereby make an electrical connection with the electrode.

12. A torch according to claim 11, wherein the actuator means includes an elongate collet closer which is in threaded engagement with the housing so as to be reversibly rotatable to advance or retract in the housing, respectively to cause the collet fingers to flex for gripping the electrode and to allow the fingers to unflex for releasing the electrode.

13. A torch according to claim 12, wherein the electrically conductive means further includes a collet located between the collet closer and the electrode holder; and wherein the collet has collet fingers which overlap with the collet fingers of the contact holder, whereby flexing and unflexing of the fingers of the contact holder is caused by flexing and unflexing of the fingers of the collet as the collet is able to advance or retract with the actuator means.

14. A torch according to claim 13, wherein an end face of the shank of the contact tip, beyond which the fingers of the contact holder extend, defines a bevelled or cam surface with which the fingers of the collet co-operate to flex and unflex as the collet respectively advances or retracts with the actuator means.

15. A torch according to claim 1, wherein the electrode holder includes a contact tip which has an externally threaded shank in threaded engagement in the housing, and a body which projects from the housing, with the contact tip defining a bore through its shank and body; and wherein the electrode holder further includes a contact holder which has a shank received in the bore of the contact tip in a friction fit therein, and a body which abuts and projects beyond an end of the contact tip body remote from the housing, with the contact holder defining a bore through its body and shank in which an electrode is receivable end-wise.

16. A torch according to claim 1, wherein the electrically conductive means includes gripping means operable for releasably gripping an electrode received into the electrode holder and thereby making electrical connection with the electrode.

17. A torch according to claim 16, wherein the gripping means includes a collet which is operable exteriorly of the housing for releasably gripping the electrode.

18. A torch according to claim 16 wherein the electrically conductive means further includes an actuator means which projects outwardly from the housing and which is adjustable to cause gripping or release of the electrode.

19. A torch according to claim 1, wherein the housing defines a flow path for the flow of inert gas therein, with the flow path communicating with a space defined within the shroud around the electrode holder.

20. A welding torch for gas tungsten arc (tungsten inert gas) welding, including:
(a) an elongate housing, of a metal of high thermal conductivity, which has a working end and a non-working end, wherein the housing has an outer tubular sleeve and an inner tubular sleeve each of which extends between a respective closure means at each end of the housing such that a passageway is defined around the inner sleeve between those ends, and wherein a bore through the housing is defined by the inner sleeve and each closure means;

(b) an electrode holder of a metal of high thermal and electrical conductivity, mounted at the working end of and projecting from the housing, which defines a bore therethrough such that an elongate electrode is receivable into the electrode holder so as to extend end-wise into the bore of the housing;

(c) a tubular gas shroud, mounted at and projecting from the working end of the housing, such that a gas discharge space is defined therein around the electrode holder, wherein the shroud is of double-wall construction to define a passageway therein, around the electrode holder; and (d) electrically conductive a means of a metal of high electrical conductivity extending within the bore of the housing from the non-working end, for releasably connecting an electrode received in the bore of the electrode holder to a terminal of an electric power source; wherein the torch is further characterized in that:

(i) the electrically conductive means projects beyond the non-working end of the housing so as to be adjustable for releasably gripping the electrode;

(ii) the torch is adapted for connection to at least one source of coolant fluid for circulation of coolant fluid through the passageways defined by the housing and the shroud; and (iii) the torch is adapted for connection to a source of inert gas for flow of the gas along the bore of the housing and discharge of the gas, at the working end of the housing, through the discharge space defined in the shroud; and wherein an end of the electrode holder remote from the housing is at or adjacent an opening defined by an end of the shroud remote from the housing whereby, with an electrode provided in the holder, a working portion of the electrode projecting from the electrode holder, beyond the opening of the shroud, is able to be of a minimum length of from 4 to 15 mm.

21. A torch according to claim 20, wherein a thermally insulating sleeve is provided around the outer tubular sleeve of the housing.

22. A torch according to claim 20, wherein the shroud is formed of a suitable thermally conductive metal.

23. A torch according to, claim 20, wherein the shroud is electrically insulated from the housing by provision of suitable insulating material therebetween.

24. A torch according to claim 20, wherein the electrically conductive means includes a collet and an elongate collet-closer, wherein the collet is of tubular form and longitudinally slit over part of its length to define resilient collet fingers which extend towards the electrode holder and are operable to releasably grip the electrode; and wherein the collet closer is in threaded engagement with the housing, at a portion of the bore of the housing adjacent to the non-working end, so as to be reversibly rotatable to advance towards and retract from the electrode holder for respectively causing flexing of the collet fingers for gripping the electrode and making an electrical contact therewith and allowing the fingers to unflex and breaking of the electrical contact.

25. A torch according to claim 24, wherein the electrode holder defines collet fingers which extend within the fingers of the collet, and the electrode holder further defines a bevelled or cam surface which co-operates with the fingers of the collet whereby the fingers of the electrode holder flex or unflex respectively with flexing or unflexing of the fingers of the collet, and the electrical contact is made through the fingers of the electrode holder.

26. A process for welding metal workpieces wherein a gas tungsten arc welding operation is conducted utilizing a welding torch including a housing which has an elongate form between a working end and a non-working end thereof and which has a double-walled construction, from the working end to the non-working end, having an outer peripheral wall and an inner peripheral wall with an annular passage defined between said peripheral walls; an annular shroud which is mounted on the housing at the working end thereof so as to project from the housing, beyond said working end; an electrode holder which is mounted on the housing at the working end thereof so as to project therefrom, beyond said working end, within but spaced from the shroud, and which holds an electrode whereby the electrode projects from an end of the holder remote from the housing; and electrically conductive means extending within the housing to the electrode holder, whereby the electrode holder is electrically connectable to a terminal of an electric power source; wherein the torch has inlet port means and outlet port means by which it is connected to a source of coolant fluid and circulates the coolant through said annular passage defined within the housing and extending along substantially the full extent of the conductive means, and through a passage defined within the shroud; wherein said end of the electrode holder remote from the housing is at or adjacent an opening defined by an end of the shroud remote from the housing whereby a working portion of the electrode projecting from the electrode holder, beyond the opening of the shroud, is able to be of a minimum length of from 4 to 15 mm: wherein the housing is formed of a metal of high thermal conductivity and the electrically conductive means and the electrode holder are formed of a metal of high thermal and high electrical conductivities, with an inner end portion of the electrode holder located within and in good thermal contact with the inner peripheral wall of the housing and the electrode is in good thermal and electrical contact with the electrode holder from within the inner peripheral wall to the end of the holder remote from the housing; and wherein, during the welding;

(i) the flow of inert gas is maintained through the shroud and around the electrode holder and, beyond the holder, around the electrode received in the electrode holder and electrically connected electrically conductive means, by flow of the inert gas to the housing from a suitable source and discharge of the inert gas from the housing through the shroud; and (ii) the flow of fluid coolant is maintained from at least one suitable source to provide circulation of coolant fluid through the passage of the housing; along substantially the full extend of the electrically conductive means, and to provide circulation of coolant fluid through the passage of the shroud; with the flow of coolant controlled so that the temperature of the electrode and shroud is substantially stabilized during the welding operation, after establishing operation of the torch.

27. A process according to claim 26, wherein the torch is operated during the welding operation at both a high current level and a high current density.

28. A process according to claim 26, wherein the torch is operated during the welding operation at a current level in excess of 450 A and up to about 1200 A.

29. A process according to claim 26, wherein the torch is operated at a current density in excess of about 45 A/mm$^2$.

30. A process according to claim 29, wherein the current density is in excess of about 60 A/mm$^2$.

31. A process according to claim 29, wherein the temperature of the electrode and shroud is stabilized such that a non-turbulent weld pool is produced.

32. A process according to claim 26, wherein the electrode used is provided with a tapered tip at its end projecting from the electrode holder, with the tip tapering at an included angle of from about 30° to about 60°.

33. A process according to claim 32, wherein the included angle is from about 40° to about 50°.

34. A process according to claim 33, wherein the included angle is about 45°.

35. A process according to any one of claims 32 to 34, wherein the electrode used has a diameter of less than about 6.4 mm.

36. A process according to claim 35, wherein the electrode diameter is about 3.2 mm.

37. A process according to claim 26, wherein the electrode projects beyond the electrode holder to a minimum extent.

38. A process according to claim 37, wherein the electrode projects from the electrode holder by from 4 to 10 mm.

39. A process according to claim 38, wherein the electrode projects from the electrode holder by from 4 to 9 mm.

40. A process according to claim 26, wherein a butt weld is provided between two metal workpieces of up to about 12 mm thick, utilizing a single weld pass and with no edge preparation of the workpieces, utilizing a suitable current and a suitable current density, the current being in excess of about 450 A and the current density being in excess of about 45 A/mm$^2$ if the thickness of the workpieces exceeds about 4 mm for ferrous workpieces and about 6 mm for non-ferrous workpieces.

41. A process according to claim 26, wherein a butt weld is provided between two workpieces of from about 12 to 25 mm thick, utilizing a respective single weld pass between each pair of adjacent faces of the workpieces and with no edge preparation, and utilizing a suitable current in excess of about 450 A and a suitable current density in excess of about 45 A/mm$^2$.

42. A process according to claim 26, wherein a butt weld is provided between two workpieces of from about 12 to 30 mm thick, utilizing a single weld pass between one pair of adjacent faces of the workpieces at which no edge preparation is provided and utilizing at least one weld pass and filler metal at the other pair of adjacent faces at which a V-type edge preparation is provided.

\* \* \* \* \*